United States Patent [19]

Parker

[11] 4,446,284

[45] May 1, 1984

[54] METHOD FOR PREPARING A POLYMER CONTAINING PENDANT UNSATURATION

[75] Inventor: Dane K. Parker, Massillon, Ohio

[73] Assignee: The Goodyear Tire & Rubber Company, Akron, Ohio

[21] Appl. No.: 383,046

[22] Filed: May 28, 1982

[51] Int. Cl.$^3$ .............................. C08F 8/28; C08F 8/40
[52] U.S. Cl. .................................... 525/383; 525/340; 525/385; 585/438
[58] Field of Search ...................... 525/326.1, 383, 385

[56] References Cited

U.S. PATENT DOCUMENTS 3,065,272 11/1962 Garner ................................. 526/274
3,078,256 2/1963 Wittig ................................. 585/437

Primary Examiner—C. A. Henderson
Attorney, Agent, or Firm—D. O. Nickey

[57] ABSTRACT

There is disclosed a process for producing polymers that contain pendant unsaturation. The present invention provides a versatile method for the preparation of polymers that contain a wide range of unsaturated pendant groups.

5 Claims, No Drawings

METHOD FOR PREPARING A POLYMER CONTAINING PENDANT UNSATURATION

TECHNICAL FIELD

There is disclosed a process for producing polymers that contain pendant unsaturation. The present invention provides a versatile method for the preparation of polymers that contain a wide range of unsaturated pendant groups.

The process of this invention proceeds at ambient temperatures and results in a small molecule being attached to the polymer by nonhydrolyzable bonds which are stable to both acid and base. The process is a phase-transfer catalyzed reaction between a polymer containing phosphonium salt moiety and an aldehyde to yield a polymer containing pendant unsaturation.

BACKGROUND ART

Over the past few years there has been rapidly growing interest in the chemical modification of polymers. This interest can be roughly divided into two main areas. The first area is concerned with the chemical modification of bulk polymers. This type of modification usually is concerned with some property alteration of the original, i.e., decreased flamability, increased solvent resistance, change in gas permeability, etc.

The second area is somewhat more specialized and deals with the preparation of polymer bound catalysts, reagents, protecting groups and chromatography supports. These polymers are usually insoluble, i.e., cross-linked.

A basic problem in the field of polymer modification is one of proper design and control of the polymer system. At present there are only two approaches to modified polymer design:

(1) polymerize or copolymerize suitable monomers containing the desired functionality; or (2) introduce the desired functionality into a pre-synthesized polymer via some chemical reaction.

The first method though simple in concept has some inherent limitations. The monomers may not be compatible with the polymerization processes or the desired monomer may be difficult or impossible to synthesize.

The second method, polymer functionalization, can normally be accomplished by one of three synthetic pathways or a combination thereof:

(1) modification of a conventional polymer by some suitable reagent, i.e., chloromethylation of polystyrene;

(2) preparation and copolymerization of monomers containing groups which, though inert to polymerization processes, can be easily converted to the desired functions by conventional means, i.e., synthesis of polymers containing pendant phenolic groups can be obtained via hydrolysis of the polymeric acetate derivative; or (3) synthesis of polymers with functional groups capable of reacting selectively and quantitatively with reactive small molecules, i.e. the reaction of a polymer containing free carboxyl groups with alcohols or amines to yield polymeric esters or amides, respectively.

D. Braun and H. G. Keppler, Makromolekulare Chem. 82, 132 (1965) disclose the preparation of polystyrene with free vinyl groups in the para position via splitting off HBr from styrene/p-(α-bromoethyl)-styrene copolymers. By copolymerization of such polymers with styrene, soluble graft copolymers or cross-linked products can be obtained. Braun and Keppler further disclose that styrene/p-(α-hydroxy-isopropyl)styrene copolymers can be dehydrated to obtain pendant isopropenyl groups.

The present invention discloses a means for synthesizing a polymer which contains a pendant unsaturated functionality by reacting an appropriately modified polymer with a small reactive molecule under phase transfer conditions in the presence of a base. The small molecule becomes attached to the polymeric substrate via a stable, nonhydrolyzable carbon-carbon double bond. The prior art does not suggest or disclose a process for the production of a polymer that contains pendant unsaturated functionality via a Wittig reaction.

It should be noted that the process of this invention allows the Wittig reaction to proceed in the presence of water. Heretofore, all Wittig reactions required strictly anhydrous solvents and reactants which would be a serious drawback when dealing with polymers. Another major point of interest in the process of the invention is that the Wittig reaction yields carbon-carbon double bond linkages. These linkages are very stable when compared to other chemical linkages often used in the binding of catalytic moieties to polymers.

DISCLOSURE OF THE INVENTION

There is disclosed a process for producing a polymer that contains pendant unsaturated functionality which comprises:

There is disclosed a process for producing a polymer that contains pendant unsaturated functionality which comprises: (a) reacting a polymer of the general structural formula:

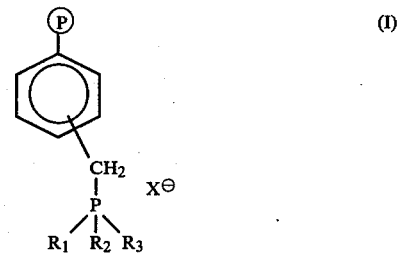

wherein $Ⓟ$ is selected from the group consisting of homopolymers of vinylbenzylchloride, vinylbenzylchloride/styrene/divinylbenzene terpolymers, butadiene/styrene/vinylbenzylchloride terpolymers, vinylbenzylchloride/butadiene/acrylonitrile polymers, acrylonitrile/styrene/vinylbenzylchloride terpolymers and isoprene/vinylbenzylchloride copolymers, and wherein $X^⊖$ is a halogen radical and $R_1$, $R_2$, and $R_3$ are the same or different radicals selected from the group comprised of phenyl or substituted phenyl radicals; (b) with an aldehyde of the structural formula:

wherein R is a hydrocarbon radical selected from the group consisting of aliphatic, cycloaliphatic, aromatic, aralkyl, heterocyclic, alkylene, polycyclic, cycloalkylene, alkylcycloalkylene, organometallic and polyaromatic radicals with the proviso that R may not contain an alkali ionizable functionality, (c) in the presence of an aqueous alkali metal base to yield a compound of the structural formula:

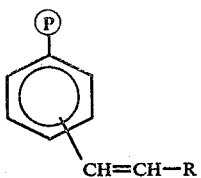

(III)

The material represented by structural formula (I) is a polymer that contains a pendant phosphonium salt. Representative of the polymers that can have pendant phosphonium salts include but are not limited to vinyl benzyl chloride (hereinafter (VBC) homopolymers, VBC/styrene/divinylbenzene (hereinafter DVB) terpolymers, butadiene/styrene/VBC terpolymers, VBC/butadiene/acrylonitrile polymers, acrylonitrile/styrene/VBC terpolymers and isoprene/VBC copolymers. These polymers are prepared by known means wherein cross-linking can range from 0 to 75 percent. The starting material, structural formula (I), is prepared by reacting a polymer containing a pendant benzyl chloride group with triphenylphosphine in a suitable solvent. Representative of solvents that can be used are: benzene, toluene, xylene, carbon tetrachloride, chloroform, chlorobenzene, dimethylformamide, acetonitrile, diethyl ether, and tetrahydrofuran. The polymer now contains a pendant phosphonium salt. This salt is then reacted with an aldehyde to yield a polymer containing a pendant unsaturated functionality.

Representative of the aldehydes that are suitable for the process of this invention are:

Aliphatic Aldehydes

Acetaldehyde
Acrollein
α-Bromocinnamaldehyde
Butyraldehyde
α-Chlorocinnamaldehyde
trans-Cinnamaldehyde
Citral
Crotonaldehyde
Decyl aldehyde
4-Dimethylaminocinnamaldehyde
2,3-Dimethylvaleraldehyde
Diphenylacetaldehyde
Dodecyl aldehyde
2-Ethylbutyraldehyde
2-Ethylhexanal
Formaldehyde
β-(2-Furyl)-acrolein
Heptaldehyde
Hexanal
trans-2-Hexenal
5-Hydroxypentanal
Isobutyraldehyde
Methacrolein
2-Methylbutyraldehyde
α-Methylcinnamaldehyde
2-Methylundecanal
3-Methylvaleraldehyde
o-Nitrocinnamaldehyde
Nonyl aldehyde
Octyl aldehyde
Phenylacetaldehyde
β-Phenylcinnamaldehyde
Phenylglyoxal monohydrate
Phenylpropargyl aldehyde
2-Phenylpropionaldehyde
Propionaldehyde
Pyruvic aldehyde
Tetradecyl aldehyde
Undecylenic aldehyde
Undecylic aldehyde
Valeraldehyde Aromatic Aldehydes p-Acetamidobenzaldehyde
o-Anisaldehyde
m-Anlsaldehyde
p-Anisaldehyde
Anthraldehyde
Benzaldehyde
3-Benzyloxybenzaldehyde
4-Benzyloxybenzaldehyde
3-Benzyloxy-4-methoxybenzaldehyde
4-Benzyloxy-3-methoxybenzaldehyde
4-Biphenylcarboxaldehyde
5-Bromo-o-anlsaldehyde
2-Bromobenzaldehyde
3-Bromobenzaldehyde
4-Bromobenzaldehyde
5-Bromosalicylaldehyde
5-Bromovanillin
5-Bromoveratraldehyde
6-Bromoveratraldehyde
10-Chloro-9-anthraldehyde
2-Chlorobenzladehyde
3-Chlorobenzaldehyde
4-Chlorobenzaldehyde
2-Chloro-4-dimethylaminobenzaldehyde
o-(2-Chloroethyl)-benzaldehyde
2-Chloro-6-fluorobenzaldehyde
3-Chloro-4-hydroxy-5-methoxybenzaldehyde
2-Chloro-5-nitrobenzaldehyde
2-Chloro-6-nitrobenzaldehyde
4-Chloro-3-nitrobenzaldehyde
5-Chloro-2-nitrobenzaldehyde
3-Cyanobenzaldehyde
4-Formyl-Benzo-15-Crown-5
4-Formyl-Benzo-18-Crown-6
4-Cyanobenzaldehyde
3,4-Dibenzyloxybenzaldehyde
3,5-Dibromosalicyaldehyde
3,5-Di-tert-butyl-4-hydroxybenzaldehyde
2,4-Dichlorobenzaldehyde
2,6-Dichlorobenzaldehyde
3,4-Dichlorobenzaldehyde
3,5-Dichlorobenzaldehyde
4-(Diethylamino)benzaldehyde
4-(β-(Diethylamino)-ethoxy-benzaldehyde   2,5-Dihydroxybenzaldehyde
3,4-Dihydroxybenzaldehyde
2,4-Dimethoxybenzaldehyde
2,5-Dimethoxybenzaldehyde
3,4-Dimethoxybenzaldehyde
3,5-Dimethoxybenzaldehyde
4,6-Dimethoxysalicylaldehyde
p-Dimethylaminobenzaldehyde
p-Dimethylaminobenzaldehyde
2,3-Dimethyl-p-anisaldehyde
2,5-Dimethyl-p-anisaldehyde
2,4-Dimethylbenzaldehyde 2,5-Dimethylbenzaldehyde
2,4-Dinitrobenzaldehyde
2,6-Dinitrobenzaldehyde
o-Ethoxybenzaldehyde p-Ethoxybenzaldehyde
4-hydroxybenzaldehyde
4-Ethoxy-3-methoxybenzaldehyde
3-Ethoxysalicylaldehyde
3-Ethoxysalicylaldehyde
N-Ethyl-3-carbazolecarboxaldehyde
2-Fluorenecarboxaldehyde
3-Fluoro-p-anisaldehyde
o-Fluorobenzaldehyde
m-Fluorobenzaldehyde
p-Fluorobenzaldehyde
4-Fluoro-nitrobenzaldehyde
5-Iodovanillin
Isophthalaldehyde
Mesitaldehyde
2-Methoxy-1-naphthaldehyde
4-Methoxy-1-naphthaldehyde
3-Methyl-p-anisaldehyde
10-Methylanthracene-9-carboxaldehyde
1-Naphthaldehyde
2-Naphthaldehyde
o-Nitrobenzaldehyde
m-Nitrobenzaldehyde
p-Nitrobenzaldehyde
6-Nitropiperonal
5-Nitrovanillin
6-Nitroveratraldehyde
Pentafluorobenzaldehyde
Phenanthrene-9-carboxaldehyde
o-Phthalicdicarboxyaldehyde
Piperonal
1-Pyrenecarboxaldehyde
Salicylaldehyde
o-Tolualdehyde
m-Tolualdehyde
p-Tolualdehyde
2,4,6-Triethoxybenzaldehyde
2,3,4-Trimethoxybenzaldehyde
2,4,5-Trimethoxybenzaldehyde
2,4,6-Trimethoxybenzaldehyde
3,4,5-Trimethoxybenzaldehyde
2,4,6-Trinitrobenzaldehyde
Vanillin
o-Vanillin Miscellaneous Aldehydes Ferrocenecarboxaldehyde
2-Furaldehyde
5-Hydroxymethylfurfural
Indole-3-carboxaldehyde
5-Methoxyindole-3-carboxaldehyde
5-Methylfurfural
5-Methylindole-3-carboxaldehyde
6-Methyl-2-pyridinecarboxaldehyde
N-Methylpyrrole-2-carboxaldehyde
3-Methyl-2-thiophenecarboxaldehyde
5-Methyl-2-thiophenecarboxaldehyde
5-Norbornene-2-carboxaldehyde
2-Pyridinecarboxaldehyde
3-Pyridinecarboxaldehyde
4-Pyridinecarboxaldehyde
Pyrrole-2-carboxaldehyde
1,2,3,6-Tetrahydrobenzaldehyde
2-Thiophenecarboxaldehyde The reaction between the phosphonium salt (I) the aldehyde (II) is carried out in the presence of a solvent. Representative of such solvents are dichloromethane, toluene, chlorobenzene, o-dichlorobenzene and benzene. ichloromethane being the most preferred.

The reaction between the aldehyde (II) and the phosphonium salt(I) is conducted in the presence of alkali metal bases. Representative of the alkali bases that are useful in the process of this invention are sodium hydroxide, potassium hydroxide, sodium carbonate and potassium carbonate. The most preferred alkali metal base is sodium hydroxide.

BEST MODE FOR CARRYING OUT THE INVENTION

The following examples are intended to illustrate and not to limit the process of the present invention.

EXAMPLE I

Preparation of Triphenylphosphonium Salt From Chloromethylated Resin

A one liter flask was charged with 28 grams (0.1068 moles) of triphenylphosphine, 40 grams of Bio-Beads SX-1 chloromethylated polystyrene resin (a commercially available resin marketed by Bio-Rad Laboratories) with 0.0536 moles of chloromethyl groups and 400 ml. of technical grade dimethylformamide (DMF). A magnetic stir bar was added and the reaction mixture was warmed under a slow nitrogen bleed to 100°–110° C. for 24 hours. The reaction mixture was filtered hot and the resin beads were successively washed with DMF, MeOH, $H_2O$, MeOH, $CH_2Cl_2$ and MeOH. The beads were air dried to yield 55.65 grams of product. Analysis of the product found 3.05% phosphorous by weight compared to a calculated theoretical amount of 3.17%.

EXAMPLE II

Preparation of 1% Crosslinked Polystyrene Resin Containing Free Pendant Vinyl Groups To a 100 millimeter reaction flask was attached a condenser, thermometer and a means for stirring. The reaction flask was charged with 3.11 grams (approximately 0.003 moles) of the polystyrene phosphonium salt prepared in Example I. 30 ml of dichloromethane, 10 ml of 37 percent aqueous formaldehyde solution (approximately 0.13 moles) and 2 grams (approximately 0.025 moles) of 50 percent aqueous sodium hydroxide was added to the reaction flask. The mixture was then stirred vigorously. The temperature rose to about 40° C. before decreasing. After 2 hours of reaction the mixture was filtered and the insoluble polymer beads were washed extensively with dichloromethane, methanol, water, dichloromethane and methanol before drying. The reaction yielded 2.09 grams of product. Infrared analysis of the product showed the distinctive absorption pattern of the aromatic vinyl group at 1622 $cm^{-1}$. Chemical analysis for phosphorous revealed 0.018% which is down from the 3.05% phosphorous of the starting polymer. 0.5 grams of product was reacted with excess $Br_2$ in $CH_2Cl_2$ at room temperature for 20 minutes. The reaction product was filtered, washed with $CH_2Cl_2$ and methanol to yield 0.63 grams of white beads after drying. The weight increased corresponds to about an 84% yield of styrene pendant groups from the triphenylphosphine salt from Example I.

EXAMPLE III

Preparation of Soluble Polyvinyl Styrene

A 250 milliliter reaction flask was fitted with a thermometer, condenser and stirring means. The reaction vessel was charged with 12.42 grams (0.03 moles) of polyvinylbenzyl triphenylphosphonium chloride, 60 ml of dichloromethane and 20 millimeters of 37% aqueous formalin solution (0.25 moles). 15 grams of a 50% aqueous sodium hydroxide solution was then added. The mixture begins to reflux within a few seconds and after approximately 1 hour of reaction time 100 milliliters of water was added to the mixture. The organic (lower) and aqueous phases were separated. The polymer was precipitated by the slow addition of the organic phase to 400 milliliters of stirred methanol. A white, fibrous polyvinylstyrene was then isolated by filtration to yield 3.9 grams of product (70.5% of theory). Infrared analysis of a thin film of the reaction product on a KBr plate showed that all the strong P-C absorptions at 1105, 743 and 710 $cm^{-1}$ were missing. Replacing these absorption bands were the C=C stretch at 1622 $cm^{-1}$, the trans CH wag at 983 $cm^{-1}$ and another strong $CH_2$ wag at 900 $cm^{-1}$.

EXAMPLE IV

Preparation of Soluble Poly-$\beta$-methylvinylstyrene

The procedure is that of Example III except that acetaldehyde was substituted for the formaldehyde solution of Example III. Infrared analysis showed that the P-C frequencies had disappeared and that strong trans CH wag at 960 $cm^{-1}$ had appeared.

EXAMPLE V

Preparation of Soluble Polyvinyl-4 Chlorostilbene

A 25 ml reaction flask was charged with 12.42 gram (0.03 moles) of polyvinyl benzyl triphenyl phosphonium chloride, 60 ml of dichloromethane, and 14.0 gm (0.10 moles) of p-chlorobenzaldehyde. A magnetic stirr bar was added and a thermometer and a condenser were attached. 20 grams of 50% aqueous NaOH solution was added all at once to the reaction flask. The temperature of the reaction mixture rose to a reflux and was stirred for one hour. 100 ml of $H_2O$ was added and the organic layer was separated. The polymer was precipitated from an excess of methanol. 5.55 grams of a white fibrous polymer was obtained. The polymer was continuously extracted with methanol for 24 hours before being dried and submitted for elemental analysis for % Cl and % P. A calculated percent is 14.7% Cl and 0.0% P. The analysis indicated 14.55% Cl and 0.3% P.

EXAMPLE VI

Attachment of 4-Formyl Benzo-15-Crown-5 to an Insoluble Cross-linked Polystyrene A one liter reaction vessel was charged with 44.42 gram (0.09 moles) of 1% cross-linked polystyrene phosphonium salt which contains 6.29% P, 400 ml of $CH_2Cl_2$, 32.5 grams (0.1096 moles) of 4'-formyl benzo-15-crown-5 and 60.0 grams of 50% aqueous sodium hydroxide solution. A condenser and a thermometer were attached and the reaction mixture was mechanically stirred. The reaction mixture turned reddish-orange in color and the temperature of the reaction mixture slowly rose to 35° C. After one hour of reaction the color faded to a light orange. Excess water was then added to the reaction mixture and the reaction mixture was then filtered. The insoluble resin was washed with $CH_2Cl_2$, MeOH, $H_2O$, and MeOH before drying to yield 28.5 gram of polymer. Infrared analysis showed a greatly enlarged aliphatic absorption at 2850-2950 $cm^{-1}$ and broad C—O absorption in the 1100 $cm^{-1}$ range.

INDUSTRIAL APPLICABILITY

The process of the present invention provides a simple and versatile technique for the chemical modification of polymeric substrates. Modified polymeric substrates can be extremely useful and diverse in their application. Polymers modified by the process of this invention can be used for block and graft copolymers, macromolecular catalysts, reagents, ligands, chelates, drugs, antioxidants, sweeteners, synergists, plasticizers and dyes, among others.

While certain representative embodiments and details have been shown for the purpose of illustrating the invention, it will be apparent to those skilled in this art that various changes and modifications may be made therein without departing from the scope of the invention.

I claim:

1. A process for producing a polymer that contains pendant unsaturated functionality which comprises: (a) reacting a polymer of the general structural formula:

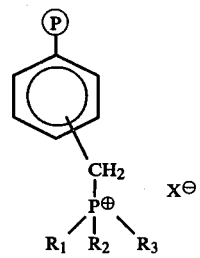

(I)

wherein

Ⓟ is selected from the group consisting of homopolymers of vinylbenzylchloride, vinylbenzylchloride/styrene/divinylbenzene terpolymers, butadiene/styrene/vinylbenzylchloride terpolymers, vinylbenzylchloride/butadiene/acrylonitrile polymers, acrylonitrile/styrene/vinylbenzylchloride terpolymers and isoprene/vinylbenzylchloride copolymers, and wherein $X^{\ominus}$ is a halogen radical and $R_1$, $R_2$, and $R_3$ are the same or different radicals selected from the group comprised of phenyl or substituted phenyl radicals; (b) with an aldehyde of the structural formula:

R—CHO (II)

wherein R is a hydrocarbon radical selected from the group consisting of aliphatic, cycloaliphatic, aromatic, aralkyl, heterocyclic, alkylene, polycyclic, cycloalkylene, alkylcycloalkylene, organometallic and polyaromatic radicals with the proviso that R may not contain an alkali ionizable functionality, (c) in the presence of an aqueous alkali metal base to yield a compound of the structural formula:

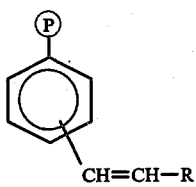

(III)

2. A process according to claim 1 wherein X is a chlorine radical, $R_1$, $R_2$, and $R_3$ are phenyl radicals, the aldehyde is formaldehyde and the alkali metal base is sodium hydroxide.

3. A process according to claim 1 wherein X is a chlorine radical, $R_1$, $R_2$, and $R_3$ are phenyl radicals, the aldehyde is 4-formyl benzo-15-crown-5:

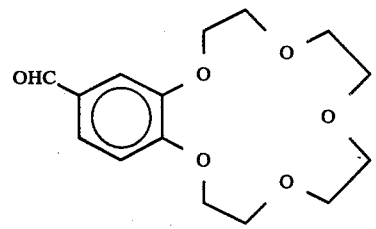

and the alkali metal base is sodium hydroxide.

4. A process according to claim 1 wherein the aqueous alkali metal base is at least 30% by weight.

5. A process according to claim 1 wherein the alkali metal base is sodium hydroxide.

* * * * *